(12) United States Patent
Farmer et al.

(10) Patent No.: US 10,149,261 B2
(45) Date of Patent: Dec. 4, 2018

(54) METHODS AND SYSTEMS FOR MOBILE DEVICE CLOCK MANAGEMENT

(71) Applicant: QUALCOMM Incorporated, San Diego, CA (US)

(72) Inventors: Dominic Gerard Farmer, Los Gatos, CA (US); Jie Wu, San Diego, CA (US); William James Morrison, San Francisco, CA (US); Tong Lin, Cupertino, CA (US); Krishnaranjan S. Rao, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 14/503,233

(22) Filed: Sep. 30, 2014

(65) Prior Publication Data

US 2015/0124675 A1     May 7, 2015

Related U.S. Application Data

(60) Provisional application No. 61/899,791, filed on Nov. 4, 2013.

(51) Int. Cl.
*H04L 7/00*       (2006.01)
*H04W 56/00*   (2009.01)
(Continued)

(52) U.S. Cl.
CPC ......... *H04W 56/002* (2013.01); *H04J 3/0661* (2013.01); *H04J 3/0685* (2013.01); *H04L 7/0012* (2013.01); *H04L 7/0025* (2013.01); *H04W 52/0216* (2013.01); *H04W 56/0035* (2013.01); *Y02D 70/00* (2018.01); *Y02D 70/1222* (2018.01); *Y02D 70/1242* (2018.01);
(Continued)

(58) Field of Classification Search
CPC .......... H04W 52/0287; H04W 52/0293; G01S 19/23; H04L 7/0012; H04L 7/0025; H04J 3/0685

See application file for complete search history.

(56) References Cited

U.S. PATENT DOCUMENTS 6,417,800 B1    7/2002    Valio et al.
6,452,541 B1    9/2002    Zhao et al.
(Continued)

FOREIGN PATENT DOCUMENTS

CN    1531795 A    9/2004
CN    1856716 A    11/2006
(Continued)

OTHER PUBLICATIONS

International Search Report and Written Opinion—PCT/US2014/063756—ISA/EPO—dated Feb. 3, 2015.

*Primary Examiner* — Salvador E Rivas
(74) *Attorney, Agent, or Firm* — Hunter Clark PLLC

(57) ABSTRACT

Disclosed are methods, systems and/or devices to calibrate a network time by acquisition of satellite positioning system (SPS) signals and different instances of time, and time-tagging SPS times according to the network time. In particular, the network time may be calibrated based, at least in part, on a first difference between first and second SPS times obtained at two SPS position fixes and a second difference between corresponding first and second time stamps.

28 Claims, 8 Drawing Sheets

(51) Int. Cl.
*H04J 3/06* (2006.01)
*H04W 52/02* (2009.01)

(52) U.S. Cl.
CPC ........ *Y02D 70/1262* (2018.01); *Y02D 70/142* (2018.01); *Y02D 70/144* (2018.01); *Y02D 70/162* (2018.01); *Y02D 70/164* (2018.01)

(56) References Cited

U.S. PATENT DOCUMENTS

| | | | |
|---|---|---|---|
| 6,453,181 B1 * | 9/2002 | Challa | H03L 1/00 455/343.4 |
| 6,684,158 B1 | 1/2004 | Garin | |
| 6,748,202 B2 | 6/2004 | Syrjarinne et al. | |
| 7,043,265 B2 | 5/2006 | Nir et al. | |
| 7,257,417 B1 | 8/2007 | Krasner | |
| 7,321,776 B2 | 1/2008 | Camp et al. | |
| 7,532,159 B2 | 5/2009 | Zhi et al. | |
| 7,978,136 B2 | 7/2011 | Duffett-Smith et al. | |
| 8,249,616 B2 | 8/2012 | Boejer et al. | |
| 8,437,693 B2 | 5/2013 | Brown et al. | |
| 8,472,283 B2 | 6/2013 | Fischer et al. | |
| 2002/0111171 A1 | 8/2002 | Boesch et al. | |
| 2002/0173322 A1 | 11/2002 | Turetzky et al. | |
| 2003/0069033 A1 | 4/2003 | Edge et al. | |
| 2003/0083814 A1 * | 5/2003 | Gronemeyer | G01S 19/23 701/478 |
| 2004/0130484 A1 * | 7/2004 | Krasner | G01S 19/235 342/357.62 |
| 2007/0025484 A1 | 2/2007 | Laine et al. | |
| 2009/0066567 A1 | 3/2009 | Huang et al. | |
| 2009/0278738 A1 * | 11/2009 | Gopinath | G01S 19/34 342/357.74 |
| 2011/0117924 A1 | 5/2011 | Brunner et al. | |
| 2011/0199262 A1 | 8/2011 | Karaoguz et al. | |
| 2012/0069871 A1 * | 3/2012 | Bickerstaff | G01S 19/235 375/146 |
| 2012/0306690 A1 | 12/2012 | Yule et al. | |
| 2013/0154693 A1 * | 6/2013 | Moeglein | H04W 52/0229 327/143 |
| 2013/0237257 A1 | 9/2013 | Walke et al. | |
| 2015/0123844 A1 | 5/2015 | Farmer et al. | |

FOREIGN PATENT DOCUMENTS

| | | | |
|---|---|---|---|
| CN | 102685874 A | 9/2012 | |
| CN | 102809753 A | 12/2012 | |
| EP | 1168635 A1 | 1/2002 | |
| EP | 1605610 A2 | 12/2005 | |
| EP | 2822334 A1 | 1/2015 | |
| JP | 2004519887 A | 7/2004 | |
| JP | 2005003430 A | 1/2005 | |
| JP | 2005086320 A | 3/2005 | |
| JP | 2007533965 A | 11/2007 | |
| WO | WO-02067439 A2 | 8/2002 | |
| WO | WO-2005036200 A1 | 4/2005 | |
| WO | WO 2007068501 A2 * | 6/2007 | ............ G01S 19/23 |
| WO | WO-2007068501 A2 | 6/2007 | |
| WO | 2008120381 A1 | 10/2008 | |
| WO | WO-2011011760 A2 | 1/2011 | |
| WO | WO-2012160490 A1 | 11/2012 | |

\* cited by examiner

METHODS AND SYSTEMS FOR MOBILE DEVICE CLOCK MANAGEMENT

CROSS-REFERENCE TO RELATED APPLICATIONS

This application claims the benefit of U.S. Provisional Application Nos. 61/899,791, entitled "Methods and Systems for Mobile Device Clock Management," filed Nov. 4, 2013, which is assigned to the assignee hereof and which is expressly incorporated herein by reference.

BACKGROUND

Field

Embodiments described herein are directed to application of mobile device clock management to permit efficient positioning operations.

Information

The global positioning system (GPS) and other like satellite and terrestrial positioning systems have enabled navigation services for mobile handsets in outdoor environments. Likewise, particular techniques for obtaining estimates of positions of mobile device in indoor environments may enable enhanced location based services in particular indoor venues such as residential, governmental or commercial venues.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
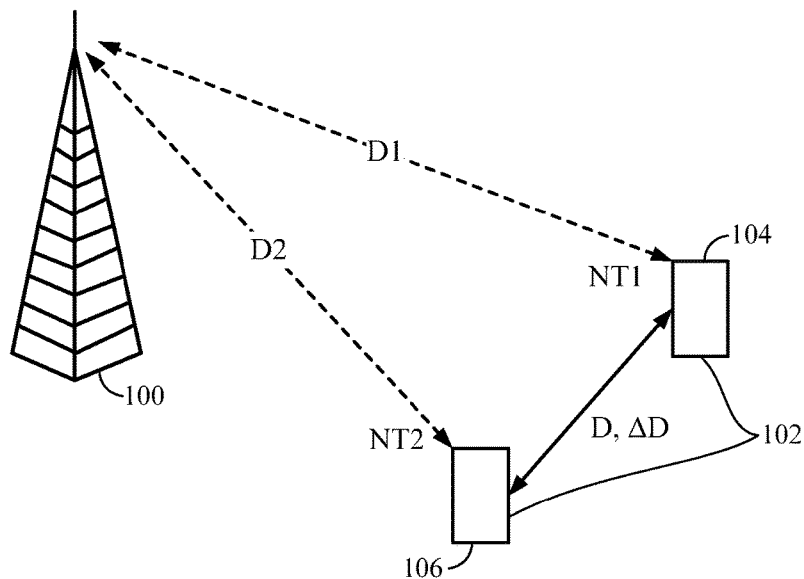
FIG. 1 illustrates a technique for calibrating a time tag uncertainty using two or more satellite positioning system (SPS) position fixes according to an embodiment.

Briefly, particular implementations are directed to a method, at a mobile device, comprising: obtaining a first value of a sleep counter and a first time stamp in response to the mobile device entering a lower power state, wherein the first time stamp is referenced to a local network time; entering a higher power state to acquire a paging signal; obtaining a second value of the sleep counter and a second time stamp while in the higher power state, wherein the second time stamp is referenced to the local network time; returning to the lower power state; and estimating an increment cycle of the sleep counter based, at least in part, on a first difference between the first time stamp and the second time stamp, and second difference between the first value of the sleep counter and the second value of the sleep counter.

Another particular implementation is directed to a mobile device comprising: a receiver; a sleep counter circuit; and one or more processors configured to: obtain a first value of a sleep counter and a first time stamp in response to the mobile device entering a lower power state, wherein the first time stamp is referenced to a local network time; transition the mobile device to a higher power state to acquire a paging signal received at the receiver; obtain a second value of the sleep counter and a second time stamp while in the higher power state, wherein the second time stamp is referenced to the local network time; transition the mobile device to the lower power state; and estimate an increment cycle of the sleep counter based, at least in part, on a first difference between the first time stamp and the second time stamp, and second difference between the first value of the sleep counter and the second value of the sleep counter.

Another particular implementation is directed to a non-transitory storage medium comprising machine-readable instructions stored thereon which are executable by one or more processors of a mobile device to: obtain a first value of a sleep counter and a first time stamp in response to the mobile device entering a lower power state, wherein the first time stamp is referenced to a local network time; transition the mobile device to a higher power state to acquire a paging signal; obtain a second value of the sleep counter and a second time stamp while in the higher power state, wherein the second time stamp is referenced to the local network time; transition the mobile device to the lower power state; and estimate an increment cycle of the sleep counter based, at least in part, on a first difference between the first time stamp and the second time stamp, and second difference between the first value of the sleep counter and the second value of the sleep counter.

Another particular implementation is directed to an apparatus at a mobile device comprising: means for obtaining a first value of a sleep counter and a first time stamp in response to the mobile device entering a lower power state, wherein the first time stamp is referenced to a local network time; means for entering a higher power state to acquire a paging signal; means for obtaining a second value of the sleep counter and a second time stamp while in the higher power state, wherein the second time stamp is referenced to the local network time; means for returning to the lower power state; and means for estimating an increment cycle of the sleep counter based, at least in part, on a first difference between the first time stamp and the second time stamp, and second difference between the first value of the sleep counter and the second value of the sleep counter.

It should be understood that the aforementioned implementations are merely example implementations, and that claimed subject matter is not necessarily limited to any particular aspect of these example implementations.

DETAILED DESCRIPTION

The global positioning system (GPS) and other like satellite positioning systems (SPSs) have enabled navigation services for mobile handsets in outdoor environments. To obtain a location or position fix (or location estimate), an SPS receiver may acquire SPS signals from four or more SPS transmitters (e.g., on space vehicles). With detection of timing parameters in the acquired SPS signals, the SPS receiver may obtain corresponding pseudorange measurements to the SPS transmitters. With knowledge of locations of the SPS transmitters (e.g., from an almanac) and the pseudorange measurements, the SPS receiver may compute a position fix.

To efficiently acquire an SPS signal for obtaining a pseudorange measurement, an SPS receiver may define a two-dimensional search window comprising Doppler dimension and a time dimension. The time dimension may be defined, at least in part, by an uncertainty in SPS time and uncertainty in a location of the SPS receiver. Here, reducing uncertainty in SPS time and/or uncertainty in location may permit a reduction in the dimension of the two-dimensional search window. This may be particularly useful in achieving low-power operation or conserving battery life by shortening a process for searching/acquiring SPS signals within a predefined search window.

According to an embodiment, a mobile device may determine a window for searching for an SPS signal based, at least in part, on a local carrier network time. Here, if the local carrier network time is accurately referenced to SPS time, an uncertainty in SPS time may be very small. For example, before a mobile device generates a position fix, the time uncertain maintained at the mobile device may be about 30.0 μsec for a CDMA network, for example, and as high as 2.0 seconds for a UMTS network, for example. A particular uncertainty maintained at the mobile device may then be used for determining a search window for acquiring SPS signals for computing a position fix. Having generated the position fix, the mobile device may have a time uncertainty of on the order of a few nanoseconds (e.g., 10.0 nanoseconds). On the other hand, if the network carrier time is not accurately referenced to SPS time, an uncertainty in SPS time may be larger.

According to an embodiment, an SPS receiver of a mobile device may calibrate a local carrier network time to SPS time by time-tagging two or more SPS position fixes. Here, in a particular implementation, an SPS receiver may obtain an accurate measurement or indication of SPS time in the course of obtaining an SPS position fix (e.g., by detecting a bit edge of a data signal modulating an acquired SPS signal). According to an embodiment, an SPS receiver may associate two or more SPS times corresponding to SPS position fixes with time tags according to a local carrier network time. As discussed below in connection with FIGS. 1 and 2 below with a particular non-limiting example, defining multiple expressions or constraints with the SPS times which are time-tagged according to a local network time, an SPS receiver may reduce uncertainty in an expression of SPS time as a function of the local carrier network time.

According to an embodiment, a mobile device may employ a local carrier network time based on a base station clock to estimate an SPS time. While an air interface standard may specify an allowable base station clock drift rate from an SPS time reference of, for example, under 50 ppb (50 ns/s), a base station in the field may in fact have better performance (e.g., clock drift rate of under 10 ppb) (3 gpp: GSM: Wide-Area 50 ppb, Pico-Cell 100 ppb (45.010)); UMTS: Wide-Area 50 ppb, Pico-Cell 100 ppb, Femto-Cell 250 ppb (FDD 25.104, TDD 25.105); LTE: Wide-Area 50 ppb, Pico-Cell 100 ppb, Femto-Cell 250 ppb (36.104, sec 6.5.1); TD-SCDMA: Wide-Area 50 ppb (from YD/T 1719-2007 Chinese TD-SCDMA RAN equipment spec, Sec 17.3, NodeB synchronization requirements). In a particular implementation, a mobile device may reduce an uncertainty in calibrating a base station clock relative to SPS time in the mobile device, and then use a calibrated growth rate to increase over time an uncertainty in local carrier network time. As pointed out above, such a reduced clock uncertainty may enable a shorter time-to-fix and/or lower power consumption.

In another implementation, measurements of network time from multiple mobile devices/SPS receivers may be crowdsourced in a network cloud for use as assistance data. Here, a mobile device may download parameters from a database server or cloud, so as to reduce or eliminate calibration. In another implementation, uncertainty in a local carrier network time may be reduced if it is known whether the mobile device is stationary, or moving at pedestrian speed.

In a particular implementation, a time of arrival of a cellular downlink signal may be used for determining a time tag or time stamp value. Here, a time of arrival may vary as the mobile device travels closer to or further away from a base station transmitting the cellular downlink signal. In a particular case in which a mobile device has a sensor responsive to motion (e.g., accelerometer), an uncertainty in a time tag need not include an uncertainty arising from possible movement (e.g., a 10 km uncertainty in range to the base station may translate to a 30.0 μs uncertainty in time). In another particular implementation, an uncertainty in a time of a time tag or time stamp may be used to calibrate a mobile device sleep clock in a paging cycle. This may make a time uncertainty small if an SPS position fix request occurs while a cellular modem is in a sleep state.

According to an embodiment, an uncertainty in a measured SPS time may comprise an uncertainty in a time tag or time stamp value (e.g., time tag according to a local network time) in combination with (e.g., added to) a time uncertainty arising from an uncertainty in propagation time. A mobile device may obtain a time reference to a local carrier network clock by acquiring a signal transmitted by a base station. As discussed below in a particular example, an uncertainty in propagation time may arise from a change in a distance between a transmitting base station and a receiving mobile device, which affects the time arrival of the signal at the receiving mobile device. A change in a propagation delay may be measured based on a measurement of change in a distance between the transmitting base station and the receiving mobile device. This may be measured using any one of several techniques such as, for example, well known trilateration techniques, tracing a trajectory of movement of the mobile device using well known position techniques, measurements obtained from inertial sensors (e.g., magnetometer, accelerometer, gyroscope, etc.) applied to a dead-reckoning procedure, just to provide a few examples. Determining a change in propagation delay based on a measured change in a distance between the transmitting base station and the receiving mobile station may enable a reduction in a time uncertainty or acquisition window for acquisition of SPS signals.

FIG. 1 illustrates a technique for calibrating a time tag or time stamp uncertainty using two or more SPS position fixes according to an embodiment. Here, a mobile device 102 may travel between two different locations relative to a base station. In this particular scenario, mobile device 102 obtains two different SPS position fixes at two different locations at SPS times (e.g., GPS times) T1 and T2, with uncertainties ΔT1 and ΔT2, respectively. Locations 104 and 106 are separated by a distance D, with uncertainty ΔD. Mobile device 102 may associate network time tags or time stamps NT1 (e.g., signal frame edge1) and NT2 (e.g., signal frame edge2) to corresponding SPS times T1 and T2, with uncertainties ΔNT1 and ΔNT2, respectively. In the particular illustrated embodiment, time tags or time stamps NT1 and NT2 are reference to a network time maintained at, and a signal transmitted by, a single base station (e.g., base station 100).

In a particular example scenario, ranges D1 and D2 from a base station to the mobile device at first and second locations 104 and 106 may be unknown. An SPS time BNT1 at an instance that signal edge1 is transmitted from the base station may be set forth in expression (1) as follows:

$$BNT1=(T1+\Delta T1)+\Delta NT1-D1/c \qquad (1)$$

where c is the speed of light.

Similarly, an SPS time BNT2 at an instance that a signal edge2 is transmitted from the base station may be set forth in expression (2) as follows:

$$BNT2=(T2+\Delta T2)+\Delta NT2-D2/c. \qquad (2)$$

A difference in SPS times obtained at the first and second position fixes may thus be set forth in expression (3) as follows $$BNT12=(T2-T1)+\Delta T1+\Delta T2+\Delta NT1+\Delta NT2-(D2-D1)/c. \qquad (3)$$

Figure 2:
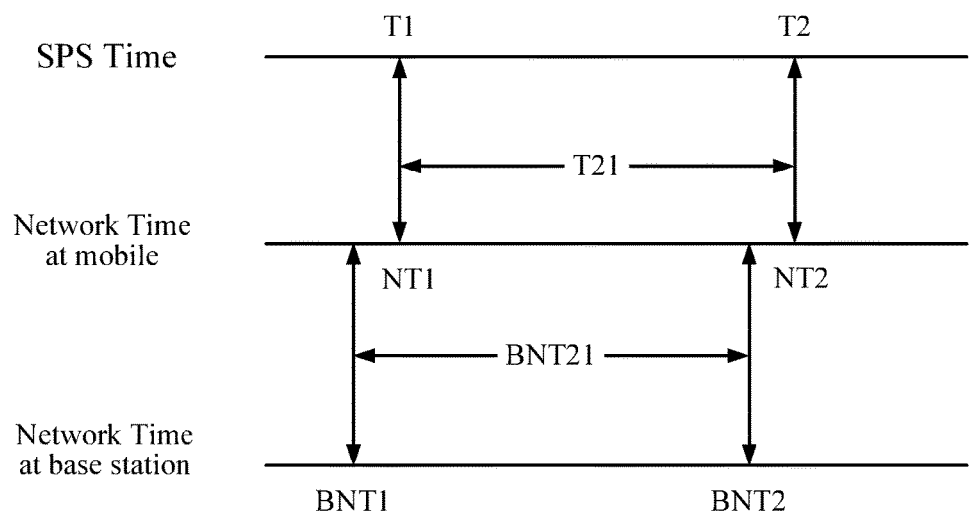
FIG. 2 is a timing diagram illustrating a calibration of a local carrier network time using two or more SPS position fixes according to an embodiment.

FIG. 2 is a timing diagram showing timelines for SPS time, local network time as maintained at a mobile device (e.g., mobile device 102) and local network time as maintained at a base station (e.g., base station 100). Here, a base station timing error during NT1 to NT2 may be set forth in expression (4) as follows:

$$Terr=BNT12-(NT2-NT1). \qquad (4)$$

According to an embodiment, if D is small or negligible a base station clock drift rate of a local network time (e.g., as maintained by a clock at mobile device or base station) may be set forth in expression (5) as follows:

$$Trate = Terr/(NT2-NT1) \qquad (5)$$

$$\approx [(T2-T1)+\Delta T1+\Delta T2+\Delta NT1+\Delta NT2-D/c-(NT2-NT1)]/(NT2-NT1).$$

In one particular application, clock uncertainty values at SPS fixes ΔT1 and ΔT2 may be a few ns while time tag or time stamp uncertainty values ΔNT1 and ΔNT2 may be ~1.0 µs (e.g., the time uncertainty of time tag or time stamp operation itself). In a particular application, to make the time tag or time stamp uncertainty much smaller than 50 ppb during calibration of network time, a constraint (ΔNT1+ΔNT2)/(NT2−NT1)<5.0 ppb may be maintained. If ΔNT1+ΔNT2=2.0 µs, for example, (NT2−NT1)>2.0 µs/5 ppb= 400 s. If the time tag or time stamp operation uncertainty is smaller, the time required may be shorter. A distance D between two positions may also impact an uncertainty of the calibration. If D is close to 0.0, there may be no impact on uncertainty.

Figure 3:
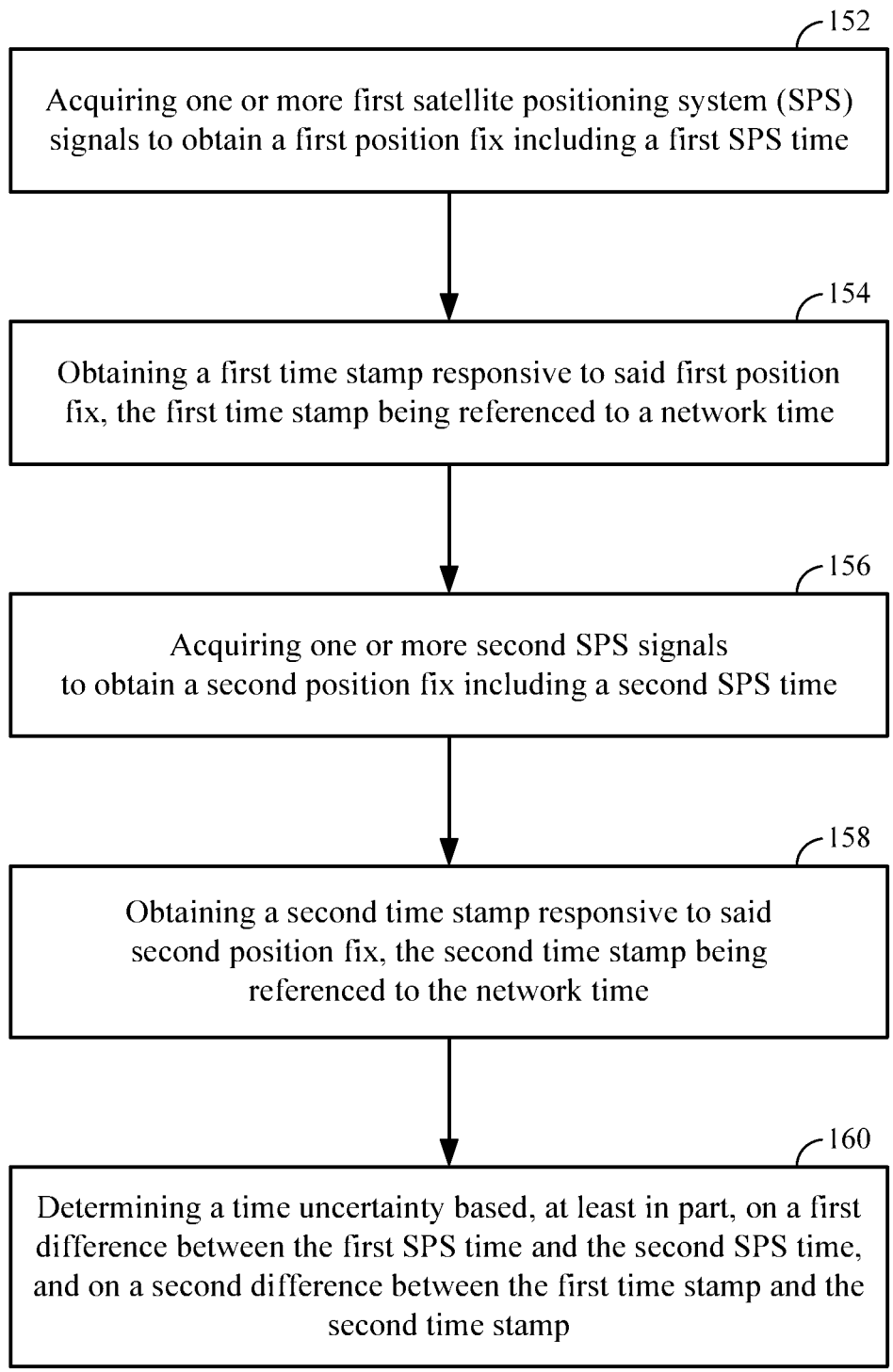
FIG. 3 is a flow diagram of a process to calibrate a local network time according to an embodiment.

FIG. 3 is a flow diagram of a process to calibrate a local network time maintained at a base station according to an embodiment. At block 152 a receiver (e.g., at mobile device 102) may acquire one or more first SPS signals to obtain a first position fix including a first SPS time (e.g., by detecting a bit edge in a data signal modulating one or more acquired SPS signals). As pointed out above, the receiver may comprise a clock to locally maintain a local network time (e.g., at a local carrier network). Responsive to the position fix obtained at block 152, the receiver may obtain a first time tag or time stamp referenced to the local network time (e.g., a local network time at a base station such as base station 100).

Subsequent to obtaining the position fix at block 152, the receiver may move its location from a first location to a second location (e.g., a distance D from location 104 to location 106). At block 156, the receiver may acquire one or more second SPS signals to obtain a position fix including a second SPS time. In particular implementation, first and second SPS signals acquired at blocks 152 and 156 may be transmitted by different SPS transmitters that are in the same global network satellite system (GNSS) such that they are synchronized (e.g., to a common time reference). However, first and second SPS signals acquired at blocks 152 and 156 may alternatively be transmitted from two different GNSSs if the GNSSs are synchronized to one another. At block 158, the receiver may obtain a second time stamp responsive to the second position fix which, like the first time stamp obtained at block 154, is referenced to the local network time.

At block 160, a time uncertainty (e.g., an uncertainty in network time relative to an SPS time) may be determined based, at least in part, on a first difference between the first and second SPS times obtained at blocks 154 and 158, and a second difference between the first and second time stamps obtained at blocks 154 and 158. For example, block 160 may compute a time uncertainty according to expression (6) discussed below. Accordingly, in a particular implementation, block 160 may compute Terr and/or Trate discussed above according to expressions (4) and (5). Values for D, D1 and D2 may be computed as Euclidean distances based, at least in part, on a known location of a base station transmitter and locations from position fixes obtained at blocks 152 and 156. It should be understood, however, that these are merely examples of how a local network time may be calibrated at a receiver and claimed subject matter is not limited in this respect.

As described above, a mobile device may measure a clock error (e.g., Terr) and/or drift rate (e.g., Trate) associated with a clock maintained at a particular base station against SPS times obtained at SPS position fixes taken at two different times (and possibly different locations). In a particular implementation, the mobile device may store such a clock error and/or drift rate measured for this particular base station. Optionally, the mobile device may store a clock error and/or draft rate for any base station that the mobile device is in communication with while performing at least two SPS position fixes as discussed above. The mobile device may use the measured drift rate to determine an estimated clock error at a particular instance. In one example, the mobile device may perform a position fix and then turn off its SPS receiver but keep track of time via a base station signal (e.g., pilot etc.)). Before the mobile device makes a subsequent position fix (e.g., at block 156), a local network time may be propagated at the mobile device using the base station signal (time tagging) so that the error may be predicted based on the measured base station drift and/or drift rate (from memory as previously measured or downloaded from a server). For example, a distance between the mobile device (e.g., mobile device 102) and a base station (e.g., base station 100) may increase as the mobile device moves from a first location (e.g., location 104) to a second location (e.g., location 106). Referencing network time to SPS time at a first position fix at block 152, network time may be used for determining an acquisition window for acquiring one or more SPS signals at block 156. Network time at the second location in advance of acquiring signals at block 156 may be propagated based, at least in part, on (D2−D1)/c. While D1 may be accurately known from an SPS position fix at block 152, D2 may be estimated/measured using other techniques. For example, as discussed above, D2 or D2−D1 may be measured using any one of several techniques such as, for example, well known trilateration techniques, tracing a trajectory of movement of the mobile device using well known position techniques, measurements obtained from inertial sensors (e.g., magnetometer, accelerometer, gyroscope, etc.) applied to a dead-reckoning procedure, just to provide a few examples. It should be understood, however, that this is merely an example of how a change in propagation delay may be computed and that claimed subject matter is not limited in this respect.

In an example implementation, a time uncertainty may be computed for a future time according to expression (6) has follows:

$$T_{unc}(t_2) = T_{unc}(t_1) + Trate \cdot (t_2 - t_1) \quad (6)$$

where:
$T_{unc}(t_1)$ is an uncertainty in time at time $t_1$; and
$T_{unc}(t_2)$ is an uncertainty in time at time $t_2$.

In a particular example, a position fix made by a mobile device at time $t_1$ may provide $T_{unc}(t_1)=15.0$ nsec. Assuming a measured Trate of 10 ppb or 10.0 nsec/sec as the mobile device goes to sleep, if the mobile device awakens to obtain an SPS position fix three hours later the mobile device may compute $T_{unc}(t_2)=15.0$ nsec+10.0 nsec/sec (3*3600 sec)=108 μsec. Using a default drift rate of 50 ppb instead of the measured drift rate Trate which instead provide $T_{unc}(t_2)=540$ μsec. This technique of computing $T_{unc}(t_2)$ according to expression (6) from a measured drift rate Trate instead of a default drift rate may enable improved performance over techniques that assume a worst case drift specified in a particular air interface standard for base station performance (while in fact a base station clock may be more stable than a worst case allowable by an applicable air interface standard).

As pointed out above, detection of a frame boundary delay on a signal transmitted by a base station may depend on a distance from a base station (as there is a signal flight time from the base station to the mobile device). Accordingly, to accurately measure drift, it may be useful to determine whether a mobile device has not moved significantly. For example, output signals from devices such as accelerometers, gyroscopes, motion sensors, magnetometers, or other devices that may sense a change in position, orientation, etc. Additionally, detection of the same short range signals such as Bluetooth or WiFi may indicate an absence of movement.

It is also pointed out that a femtocell or WiFi access point may also maintain a more stable clock than that of a mobile device. As such, the techniques described herein may be applicable to not only base stations but also a variety of other stationary wireless transceivers. Since a clock error may be smaller than a maximum allowable drift according to a particular air interface standard, a search window for acquiring an SPS signal may be reduced significantly (perhaps 2-5×; which may depend on how long it has been since the last fix if assuming a constant drift).

According to an embodiment, a measured base station clock drift may be stored locally in a mobile device base station almanac (e.g., as a subset of an entire base station almanac based, at least in part, on where the mobile device is/has been) and/or periodically (or immediately) uploaded to location server that maintains an overall base station almanac. Alternatively, a base station identifier (e.g., BTS ID information such as SID/NID/BSID or MACID) may be updated depending on a particular type of base station it was. A crowd-sourcing server may combine uploaded measurements to compute parameters such as mean, median, statistical fit, etc., and make an appropriate indication of base station clock drift (e.g., Terr) and/or drift rate (e.g., Trate) available to mobile devices as positioning assistance data.

Figure 4:
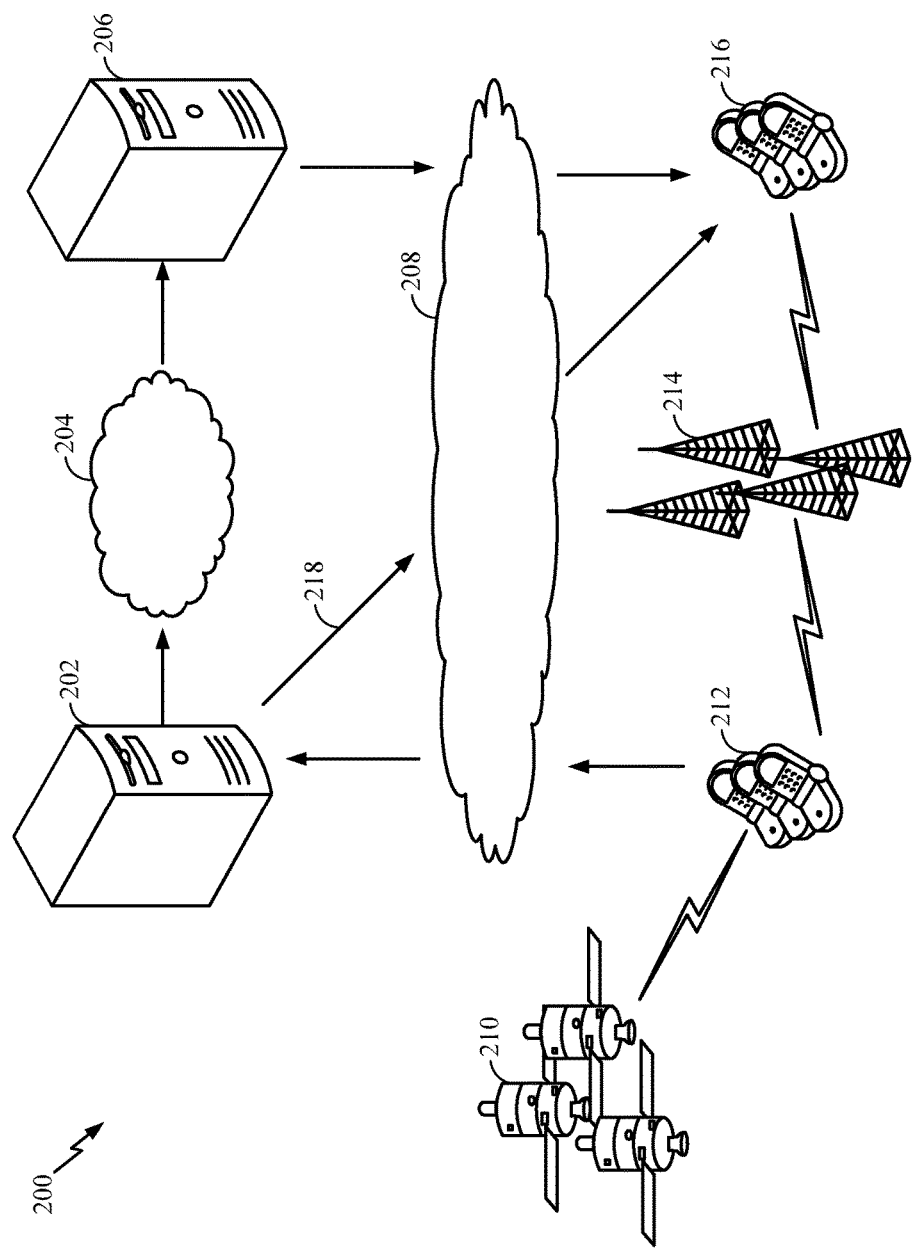
FIG. 4 is a schematic diagram of a system for crowdsourcing messages for creating or updating positioning assistance data according to an embodiment.

FIG. 4 is a system diagram of a system for crowdsourcing messages for creating or updating positioning assistance data according to an embodiment. Mobile devices 212 and 216 may be in communication with a carrier network through network cloud 208. Mobile devices 112 may obtain measurements based on observations of signals transmitted from base stations 213 and SPS transmitters 210, and forwarded these measurements in messages to crowdsourcing server 202. Crowdsourcing server 202 may compute positioning assistance data to be forwarded to location server 206. Mobile devices 216 may then receive positioning assistance data from messages transmitted by location server 206 through network cloud 208.

As discussed above in particular embodiments, a mobile device 212 may acquire SPS signals transmitted by SPS transmitters 210 to obtain two or more SPS position fixes providing corresponding SPS times. Being in communication with a base station 214, the mobile device 212 may obtain a local network time being maintained by the base station 214 and may time-tag the two or more position fixes according to the local network time. In a particular implementation, as discussed above, for the particular base station 214, the mobile device 212 may compute Terr and/or Trate according to expressions (4) and (5), and forward these values in messages to crowdsourcing server 202. For the particular base station 214, crowdsourcing server may aggregate values of Terr and/or Trate from multiple mobile devices 212 to provide positioning assistance data (e.g., aggregated, filtered and/or averaged values for Terr and/or Trate) available to mobile devices 216.

Figure 5:
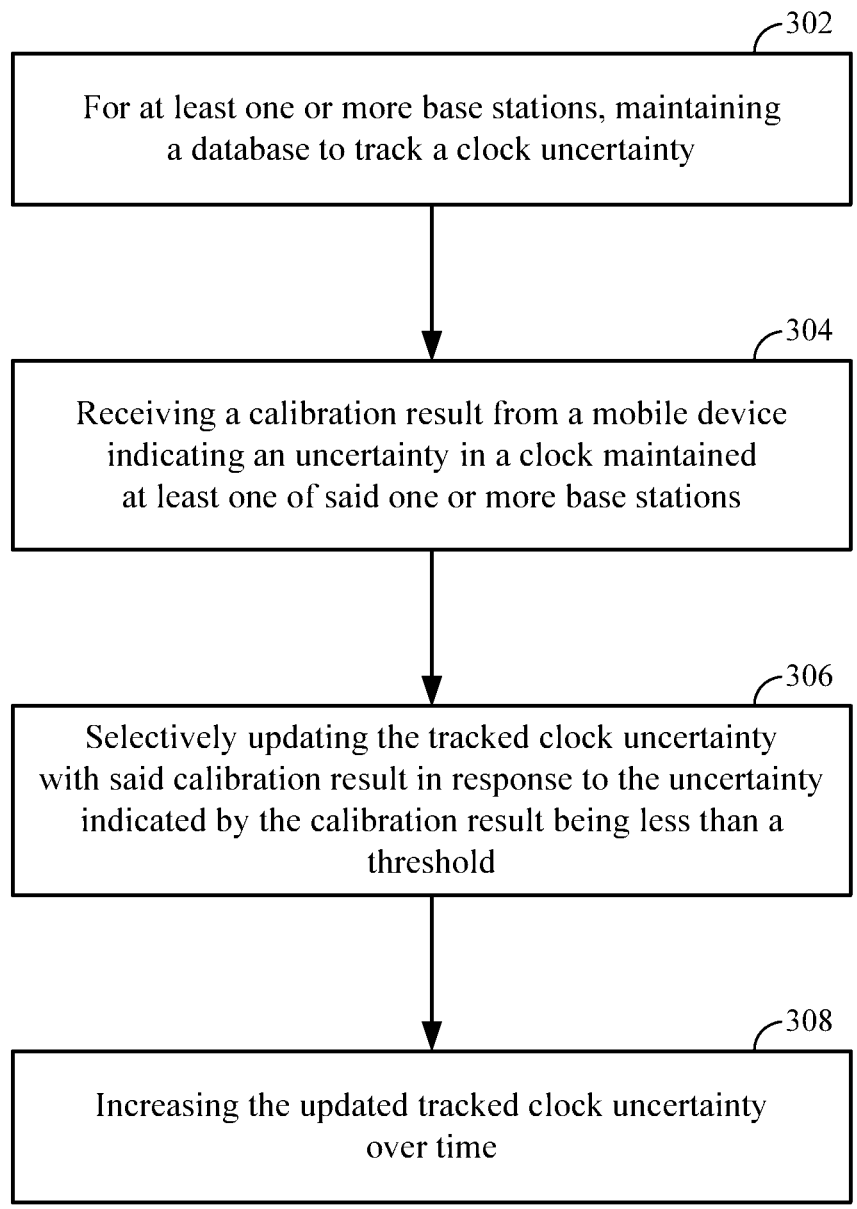
FIG. 5 is a flow diagram of a process to track an uncertainty of a clock maintained at a base station according to an embodiment.

FIG. 5 is a flow diagram of a process to track an uncertainty of a clock maintained at a base station according to an embodiment. At block 302, a database may be maintained to track an uncertainty of a clock maintained at a base station. For example, such a database may be maintained at crowdsourcing server 202. At block 304, a calibration result may be received from a mobile device (e.g., a mobile device 212) an uncertainty in a clock maintained at the at least one base station (e.g., a computed value for Terr and/or Trate). At block 306, the uncertainty tracked in a database at block 306 may be selectively updated based, at least in part, on whether an uncertainty level indicated by the calibration result is less than a threshold value. Updating the tracked uncertainty with a calibration result having an uncertainty exceeding the threshold value, for example, may not improve the usefulness of the tracked clock uncertainty.

According to an embodiment, a mobile device may be maintained in a low power state during which, for example, certain functions are powered down. For example, a mobile phone may be maintained in a sleep state that is interrupted periodically with short periods in which a receiver may acquire a signal (e.g., a paging slot to acquire a paging signal from a cellular transmitter). In one particular implementation, for example, on five second periods a mobile phone may briefly awaken for a 90-100 msec duration to acquire paging signal. While the mobile device is in a lower power state such as a sleep state, the mobile device may maintain a sleep counter to be used in propagating time maintained by a system clock. As pointed out above, having an accurate system clock time may enable the mobile device to obtain estimates of its location by acquiring SPS signals with a small search window, enabling a fast time-to-fix.

In a particular implementation, a mobile device in a sleep state or lower power state may operate such that power may be removed from a wireless transceiver (e.g., WWAN or cellular transceiver) and/or other components. In such a lower power state, a wireless transceiver may not have full functionality to receive signals from and transmit signals to a wireless network, but functionality may be quickly restored by fully powering the device. While a wireless transceiver may have a reduced functionality in such a lower power state, in an embodiment a mobile device may have an SPS receiver that is powered to acquiring signals while the mobile device is in the lower power state. As such, during a sleep or lower power state a process on the mobile device may be capable of issuing a request to perform an SPS position fix and an SPS receiver may be capable of fulfilling this request even if the mobile device is in the lower power state. Having an accurate system clock time available as the SPS receiver receives a request while the mobile device is in the lower power state may enable the small search window and corresponding fast time-to-fix.

According to an embodiment, a system clock value of a mobile device may be propagated while the mobile device is in a sleep state according to expression (6) as follows:

$$T_{C2} = T_{C1} + \Delta T \quad (6)$$

Where:
$T_{C1}$ is a beginning system clock time (e.g., at a time where a mobile device enters lower power state such as a sleep state);
$T_{C2}$ is a propagated system clock time; and
$\Delta T$ is an amount that a system time is propagated.

According to an embodiment, an amount of time that a system clock is propagated $\Delta T$ may be computed based, at least in part, a change in a value of a counter that is incremented on increment cycles from a start time (e.g., entering a sleep state) and an end time (e.g., servicing a request for an SPS position fix) according to expression (7) as follows:

$$\Delta T = (C2 - C1) T_{SC}, \quad (7)$$

where:
$T_{SC}$ is an increment cycle of a sleep counter;
C1 is a value of a sleep counter at an instance that a mobile device enters a sleep state; and
C2 is a value of a sleep counter at an end time.

Figure 6:
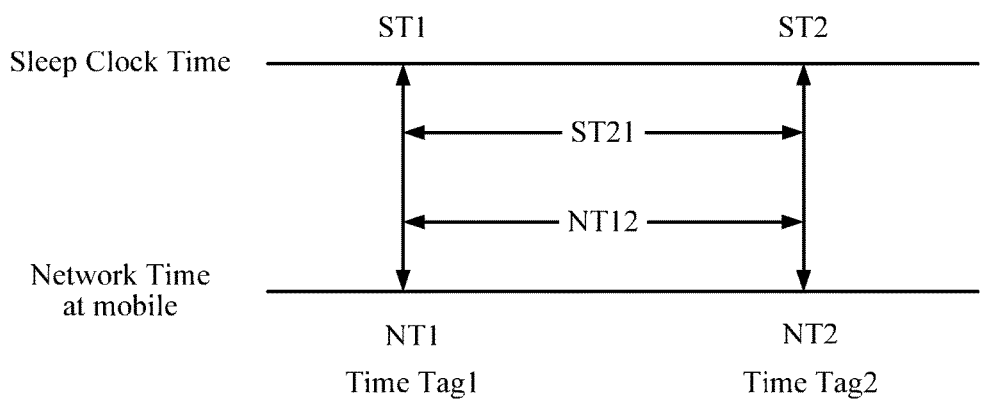
FIG. 6 is a timing diagram illustrating a technique to calibrate a sleep clock of a mobile device according to an embodiment.

According an embodiment, a duration of an increment cycle of a sleep counter $T_{SC}$ may be estimated based, at least in part, on a local network time maintained at a base station as described above. For example, as illustrated in FIG. 6, values of a sleep clock time may be time-tagged or time stamped at two different instances according to a local network time. Here, for example, values of a sleep counter ($C_{ST1}$ and $C_{ST2}$) may be time-tagged or time stamped with a network time at network times NT1 and NT2. A value for $T_{SC}$ may be computed according to expression (8) as follows:

$$T_{SC} = (NT2 - NT1)/(C_{ST2} - C_{ST1}) \quad (8)$$

In a particular implementation, network times for time tags NT1 and NT2 may be obtained from acquisition of paging signals at paging slots. According to an embodiment, uncertainties in time tags NT1 and NT2, and uncertainties in sleep clock counts (e.g., to account for fractions of count increments) may contribute to uncertainties in an estimate of $T_{SC}$ computed according to expression (8). For example, contemporaneously with performing a time tag, a sleep count may be read to achieve an uncertainty to within 4.0 μs. An additional 1.0 μs may be included to increase a total uncertainty to 5.0 μs. Suppose, for example, that time tags NT1 and NT2 are spaced by 1.28 sec and a sleep clock may be calibrated to an accuracy of 10.0 μs/1.28 sec=7.8 ppm (distance moved by mobile device in 1.28 sec may be small and ignored). In a particular implementation, if an SPS session is started during an LTE sleep state, there may be no sleep time tag needed. Instead, a sleep counter may be read again. A time uncertainty may be obtained by using a last regular time tag uncertainty, plus the sleep clock uncertainty part (e.g., 10.0 μs/1.28 s× time since last regular time tag), plus uncertainty from temperature introduced into sleep clock drift.

Figure 7:
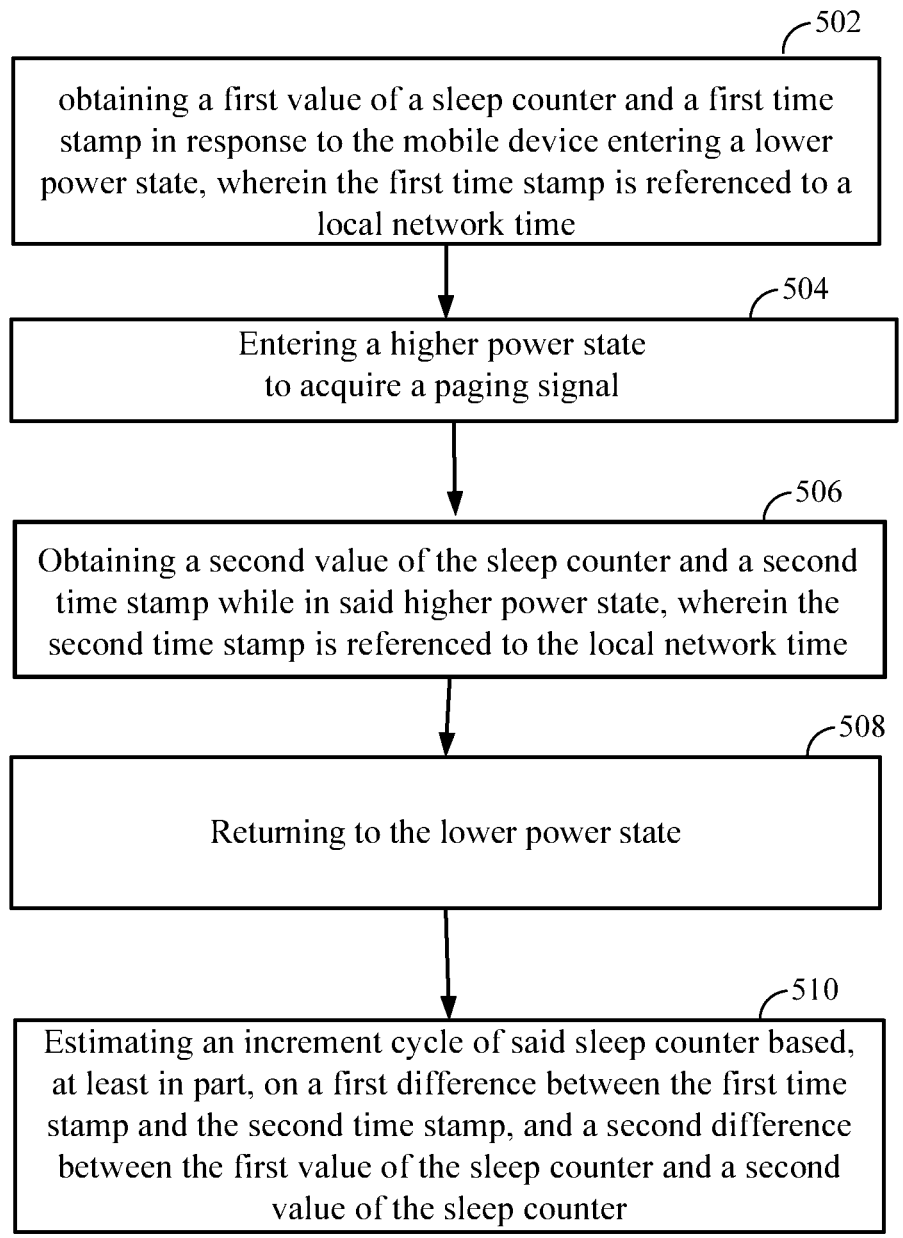
FIG. 7 is a flow diagram of a process for updating a sleep clock time according to an embodiment.

As shown in FIG. 7, for example, a mobile device may obtain a first value of a sleep counter in response to the mobile device entering a lower power state (e.g., a sleep state) at block 502. The mobile device may then enter a higher power state to acquire a paging signal at block 504. Block 504 may occur, for example, as the mobile device awakens from a sleep state and resumes to a higher power state during a paging slot. Acquiring the paging signal, the mobile device may sample the local network time again. Block 506 may then obtain a second value of the sleep counter and a second time stamp while the mobile device is in the higher power state. The second time stamp is referenced to the local network time and may be based, at least in part, on the local network time as sampled from acquisition of the paging signal. At block 508, the mobile device may return to a lower power state. In a particular implementation, the first and second values of the sleep counter obtained at blocks 502 and 506 may comprise CsTt and CsT2. respectively. In a particular implementation, the first and second time stamps may be referenced to a local network time (e.g., as network times NT1 and NT2). At block 510, a mobile device may estimate an increment cycle of the sleep counter (e.g., Tsc) according to expression (8) above, for example. The estimate of the increment cycle may then be used to update a system clock time to define a time uncertainty for obtaining an SPS position fix as discussed above.

Figure 8:
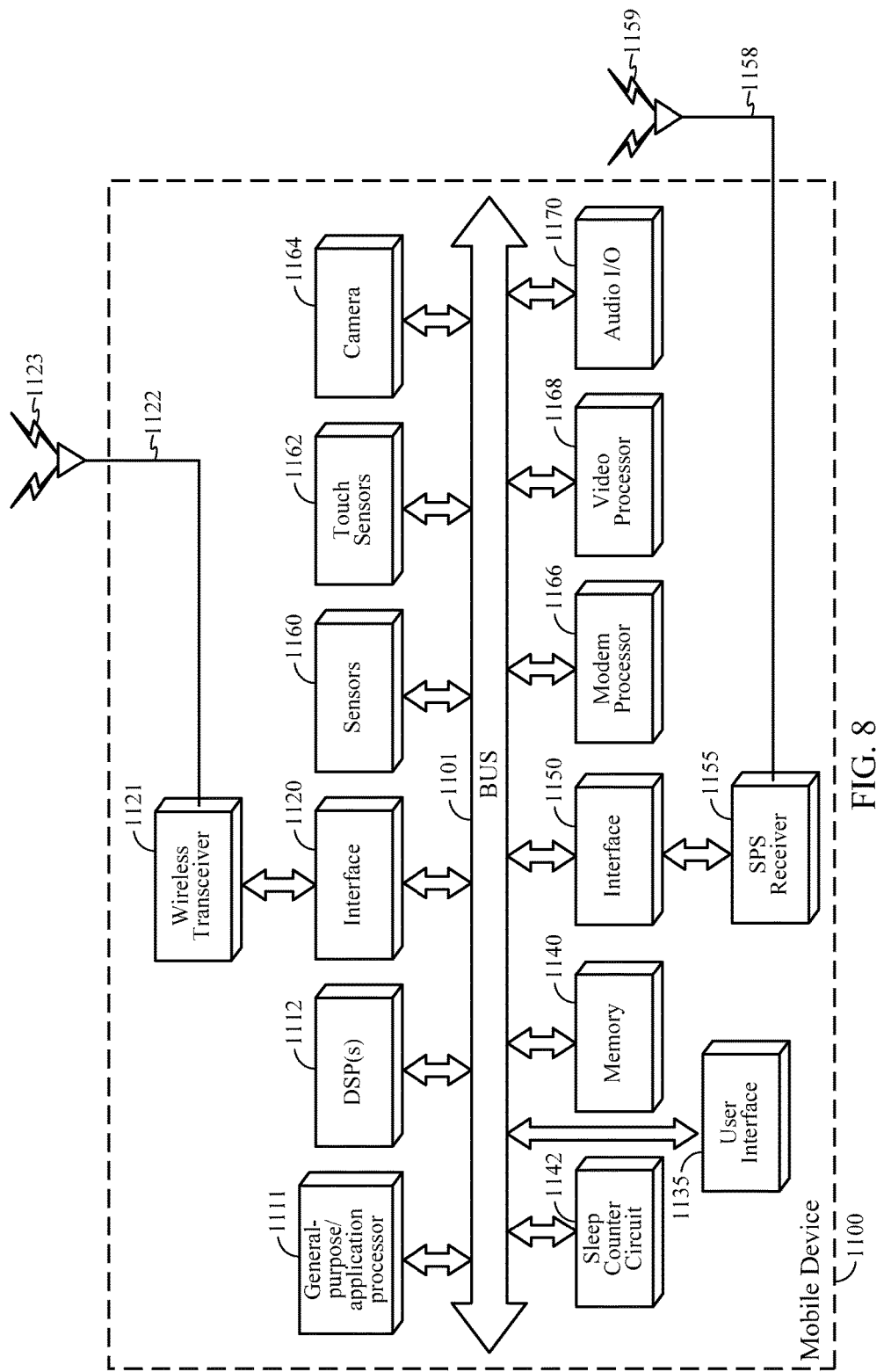
FIG. 8 is a schematic block diagram illustrating aspects of an exemplary device, in accordance with an implementation.

FIG. 8 is a schematic diagram of a mobile device that may be used for obtaining SPS position fixes and/or calibrating local carrier network time based on two or more SPS position fixes that are time tagged according to local carrier network time according to an embodiment. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to corresponding multiple wireless communication standards such as, for example, versions of IEEE Std. 802.11, CDMA, WCDMA, LTE, UMTS, GSM, AMPS, Zigbee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. For example, SPS receiver 1155 may be capable of acquiring SPS signals to obtain a first position fix including a first SPS time at block 152 and to obtain a second position fix including a second SPS time at block 156. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals (e.g., signals acquired from wireless transceiver 1121) for use in performing positioning operations may be performed in memory 1140 or registers (not shown). As such, general-purpose processor(s) 1111, memory 1140, DSP(s) 1112 and/or specialized processors may provide a positioning engine for use in processing measurements to estimate a location of mobile device 1100.

Also shown in FIG. 8, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein.

In a particular implementation, general-purpose processor(s) 1111 and/or DSP(s) 1112 in combination with machine-readable instructions stored on memory 1140 may execute all or portions of actions and/or operations set forth in blocks 152 through 160 shown in FIG. 3. For example, based, at least in part, on acquisition of a signal transmitted by a base station and acquired at wireless transceiver 1121, general-purpose processor(s) 1111 and/or DSP(s) 1112 in combination with machine-readable instructions stored on memory 1140 may obtain time stamps referenced to a network time at blocks 154 and 158. General-purpose processor(s) 1111 and/or DSP(s) 1112 in combination with machine-readable instructions stored on memory 1140 may then determine a time uncertainty at block 160.

In another particular implementation, general-purpose processor(s) 1111 and/or DSP(s) 1112 in combination with machine-readable instructions stored on memory 1140 may execute all or portions of actions and/or operations set forth in blocks 502 through 510 shown in FIG. 7. At blocks 502 and 504, for example, general-purpose processor(s) 1111 and/or DSP(s) 1112 in combination with machine-readable instructions stored on memory 1140 may obtain first and second values of a sleep counter maintained at sleep counter circuit 1142. At blocks 506 and 508, general-purpose processor(s) 1111 and/or DSP(s) 1112 in combination with machine-readable instructions stored on memory 1140 may further apply first and second time stamps to respective first and second values of the sleep counter. Finally, general-purpose processor(s) 1111 and/or DSP(s) 1112 in combination with machine-readable instructions stored on memory 1140 may compute an estimate of an increment cycle of the sleep counter at block 510.

Also shown in FIG. 8, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors that may enable mobile device 1100 to determine relative changes in location and/or current speed and heading. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose application processor 1111 in support of one or more applications such as, for example, applications directed to positioning or navigation operations.

In a particular implementation, mobile device 1100 may comprise a dedicated modem processor 1166 capable of performing baseband processing of signals received and down converted at wireless transceiver 1121 or SPS receiver 1155. Similarly, modem processor 1166 may perform baseband processing of signals to be up converted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

As depicted, mobile device 1100 may further comprise a sleep counter circuit 1142 that is capable of maintaining a sleep counter by, for example, incrementing a sleep counter on set increment cycles as discussed above. In particular implementations, sleep counter circuit 1142 may comprise registers, oscillators, input terminals output terminals, etc. capable of providing values of a sleep counter. In particular embodiments, as discussed above, sleep counter circuit 1142 may provide sleep counter values at particular events such as entering a sleep state (or other lower power state) and awakening from a sleep state (or transitioning to other higher power state). In a particular implementation, for example, sleep counter circuit 1142 may continue to increment a sleep counter even if mobile device 1100 is in a sleep state (e.g., including removal of power to wireless transceiver 1121, general purpose/application processor 1111, DSP(s) 1112, etc.).

Figure 9:
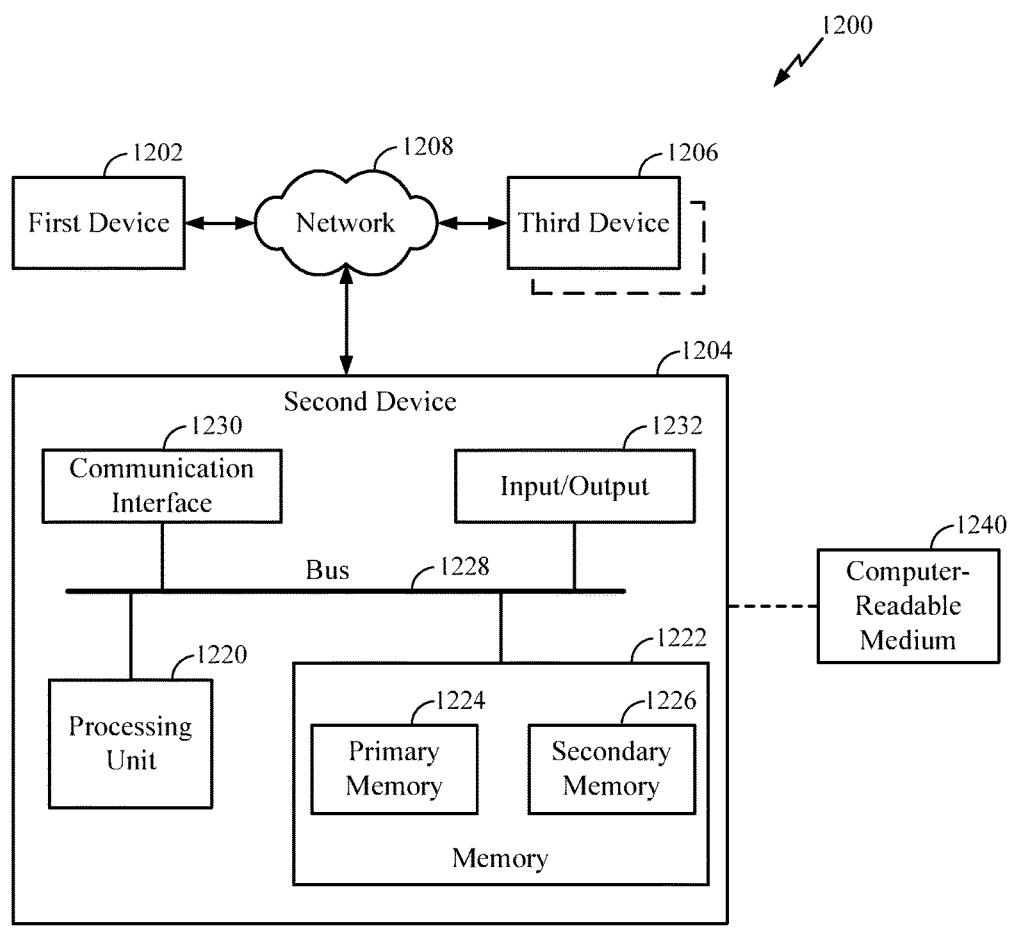
FIG. 9 is a schematic block diagram of an example computing platform in accordance with an implementation.

FIG. 9 is a schematic diagram illustrating an example system 1200 that may include one or more devices configurable to implement techniques or processes described above. System 1200 may include, for example, a first device 1202, a second device 1204, and a third device 1206, which may be operatively coupled together through a wireless communications network 1208. First device 1202, second device 1204 and/or third device 1206 may be used to implement crowdsourcing server 202 and/or location server 206 (FIG. 4). In an aspect, first device 1202 may comprise a server capable of providing positioning assistance data such as, for example, a base station almanac. Also, in an aspect, wireless communications network 1208 may comprise one or more wireless access points, for example. However, claimed subject matter is not limited in scope in these respects.

First device 1202, second device 1204 and third device 1206 may be representative of any device, appliance or machine that may be configurable to exchange data over wireless communications network 1208. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1202, 1204, and 1206, respectively, may comprise one or more of a base station almanac server, a base station, or a mobile device in accordance with the examples described herein. In another example implementation, any of the first, second, and third devices 1202, 1204, and 1206, respectively, may comprise a database to collect, store and update an uncertainty carrier network time as maintained at particular base stations in a network for use as positioning assistance data. Here, for at least one base station, a database may track clock uncertainty. Calibration results may be received from one or more mobile devices indicating an uncertainty in a clock maintained at the at least one base station. The tracked clock uncertainty may then be selectively updated with the calibration results if the uncertainty indicated by the calibration result is less than a threshold. The updated tracked clock uncertainty may then be increased over time.

Similarly, wireless communications network 1208 may be representative of one or more communication links, processes, or resources configurable to support the exchange of data between at least two of first device 1202, second device 1204, and third device 1206. By way of example but not limitation, wireless communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1206, there may be additional like devices operatively coupled to wireless communications network 1208.

It is recognized that all or part of the various devices and networks shown in system 1200, and the processes and methods as further described herein, may be implemented using or otherwise including hardware, firmware, software, or any combination thereof.

Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

In a particular implementation, processing unit 1220 may execute machine-readable stored in memory 1222 to execute actions and/or operations at blocks 302, 304, 306 and/or 308 for tracking and updating an uncertainty in a clock maintained at a base station.

Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium.

Second device 1204 may include, for example, a communication interface 1030 that provides for or otherwise supports the operative coupling of second device 1204 to at least wireless communications network 1208. By way of example but not limitation, communication interface 1230 may include a network interface device or card, a modem, a router, a switch, a transceiver, and the like.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, microcontrollers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATS") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a mobile device, comprising:
   obtaining a first value of a sleep counter and a first time stamp prior to the mobile device entering a lower power state, wherein the first time stamp is referenced to a local network time;
   entering a higher power state to acquire a paging signal; obtaining a second value of the sleep counter and a second time stamp while in the higher power state, wherein the second time stamp is referenced to the local network time;
   returning to the lower power state; and while in the lower power state, estimating an increment cycle of the sleep counter based, at least in part, on a first difference between the first time stamp and the second time stamp, and at least in part on a second difference between the first value of the sleep counter and the second value of the sleep counter; and
   while in the lower power state, perform an SPS position fix based, at least in part, on the estimated increment cycle of a sleep counter.

2. The method of claim 1, and further comprising determining the local network time based, at least in part, on acquisition of the paging signal.

3. The method of claim 1, and further comprising:
   propagating a system clock time based, at least in part, on the estimated increment cycle of the sleep counter.

4. The method of claim 3, wherein the system clock time is propagated by an amount based, at least in part, on the second difference multiplied by the estimated increment cycle of the sleep counter.

5. The method of claim 3, and further comprising initiating acquisition of one or more satellite positioning system (SPS) signals based, at least in part, on the propagated system clock time.

6. The method of claim 5, and further comprising determining a time uncertainty for acquisition of the one or more SPS signals based, at least in part, on a temperature of the mobile device.

7. The method of claim 6, wherein the time uncertainty is further determined based, at least in part, on an uncertainty is the local network time.

8. The method of claim 1, and further comprising:
   determining to perform the SPS position fix while the mobile device is in the lower power state.

9. The method of claim 1, wherein the lower power state comprises a sleep state.

10. The method of claim 1, wherein the first time stamp and the second time stamp are obtained during paging slots.

11. A mobile device comprising:
    a receiver; a sleep counter circuit; and
    one or more processors configured to:
      obtain a first value of a sleep counter and a first time stamp prior to the mobile device entering a lower power state, wherein the first time stamp is to be referenced to a local network time to be maintained at a base station;
      transition the mobile device to a higher power state to acquire a paging signal to be received at the receiver;
      obtain a second value of the sleep counter and a second time stamp while in the higher power state, wherein the second time stamp is to be referenced to the local network time;
      transition the mobile device to the lower power state; while in the lower power state, estimate an increment cycle of the sleep counter based, at least in part, on a first difference between the first time stamp and the second time stamp, and based at least in part on a second difference between the first value of the sleep counter and the second value of the sleep counter; and
      while in the lower power state, perform an SPS position fix based, at least in part, on the estimated increment cycle of a sleep counter.

12. The mobile device of claim 11, wherein the one or more processors are further configured to determine the local network time based, at least in part, on acquisition the paging signal.

13. The mobile device of claim 11, wherein the one or more processors are further configured to propagate a system clock time based, at least in part, on the estimated increment cycle of the sleep counter circuit.

14. The mobile device of claim 13, wherein the one or processors are further configured to propagate the system clock time by an amount based, at least in part, on the second difference multiplied by the estimated increment cycle.

15. The mobile device of claim 13, and wherein the one or more processors are further configured to initiate acquisition of one or more satellite positioning system (SPS) signals based, at least in part, on the propagated system clock time.

16. The mobile device of claim 15, wherein the one or more processors are further configured to determine a time uncertainty for acquisition of the one or more SPS signals based, at least in part, on a temperature of the mobile device.

17. An article, comprising:
    a non-transitory storage medium having stored thereon instructions executable by a mobile device to:
      obtain a first value of a sleep counter and a first time stamp prior to the mobile device entering a lower power state, wherein the first time stamp is to be referenced to a local network time to be maintained at a base station;

transition the mobile device to a higher power state to acquire a paging signal;

obtain a second value of the sleep counter and a second time stamp while in the higher power state, wherein the second time stamp is to be referenced to the local network time;

transition the mobile device to the lower power state; and while in the lower power state, estimate an increment cycle of the sleep counter based, at least in part, on a first difference between the first time stamp and the second time stamp, and based at least in part on a second difference between the first value of the sleep counter and the second value of the sleep counter; and while in the lower power state, perform an SPS position fix based, at least in part, on the estimated increment cycle of a sleep counter.

18. The article of claim 17, wherein the storage medium having stored thereon further instructions executable by the mobile device to determine the local network time based, at least in part, on acquisition of the paging signal.

19. The article of claim 18, wherein the storage medium having stored thereon further instructions executable by the mobile device to:

propagate a system clock time based, at least in part, on the estimated increment cycle of the sleep counter.

20. The article of claim 19, wherein the system clock time is to be propagated by an amount based, at least in part, on the second difference multiplied by the estimated increment cycle.

21. The article of claim 19, wherein the storage medium having stored thereon further instructions executable by the mobile device to initiate acquisition of one or more satellite positioning system (SPS) signals based, at least in part, on the propagated system clock time.

22. At a mobile device, an apparatus comprising:

means for obtaining a first value of a sleep counter and a first time stamp prior to the mobile device entering a lower power state, wherein the first time stamp is referenced to a local network time maintained at a base station;

means for entering a higher power state to acquire a paging signal;

means for obtaining a second value of the sleep counter and a second time stamp while in the higher power state, wherein the second time stamp is referenced to the local network time; means for returning to the lower power state;

means for estimating, while in the lower power state, an increment cycle of the sleep counter based, at least in part, on a first difference between the first time stamp and the second time stamp, and based at least in part on a second difference between the first value of the sleep counter and the second value of the sleep counter; and means for performing an SPS position fix while in the lower power state based, at least in part, on the estimated increment cycle of a sleep counter.

23. The apparatus of claim 22, and further comprising means for determining the local network time based, at least in part, on acquisition of the paging signal.

24. The apparatus of claim 22, and further comprising:

means for propagating a system clock time based, at least in part, on the estimated increment cycle of the sleep counter.

25. The apparatus of claim 24, wherein the system clock time is propagated by an amount based, at least in part, on the second difference multiplied by the estimated increment cycle of the sleep counter.

26. The apparatus of claim 24, and further comprising means for initiating acquisition of one or more satellite positioning system (SPS) signals based, at least in part, on the propagated system clock time.

27. The apparatus of claim 26, and further comprising means for determining a time uncertainty for acquisition of the one or more SPS signals based, at least in part, on a temperature of the mobile device.

28. The apparatus of claim 27, wherein the time uncertainty is further determined based, at least in part, on an uncertainty is the local network time.

* * * * *